J. W. CONWAY.
AUTOMOBILE STEP.
APPLICATION FILED MAR. 2, 1922.

1,428,006.

Patented Sept. 5, 1922.

INVENTOR
J. W. Conway
BY
Heath Futchens
ATTORNEY

Patented Sept. 5, 1922.

1,428,006

UNITED STATES PATENT OFFICE.

JOHN W. CONWAY, OF HARTFORD, CONNECTICUT.

AUTOMOBILE STEP.

Application filed March 2, 1922. Serial No. 540,472.

*To all whom it may concern:*

Be it known that JOHN W. CONWAY, a citizen of the United States, residing at Hartford, in the county of Hartford and State of Connecticut, has invented certain new and useful Improvements in Automobile Steps, of which the following is a specification.

This invention relates to an automobile step.

The title is adapted more or less for convenience as the article can be employed with advantage in conjunction with motor-cycles and like vehicles. It is a matter of fact that the owner of a car usually identifies it by its number particularly when in a hurry. There are times when an owner may request a guest alone to enter his car. The owner will identify his machine by its number which is quite apt to be forgotten by the guest. I furnish an article by which this possibility is altogether eliminated in that I provide in conjunction with the step more positive identifying means so that one not intimately familiar with the particular car may at once readily identify it by the data on the step, this data being usually remote from the tread portion of the step.

In the drawings accompanying and forming part of the present specification I have shown in detail one of the several forms of embodiment of the invention, of which there are obviously many. In order to enable those skilled in the art to practice the invention I will set forth rather fully this particular form. Obviously I am in no sense restricted thereto. I may depart therefrom in a number of respects within the scope of the invention defined by the claim following said description.

Referring to said drawing:—

Like characters refer to like parts throughout the several views.

Figure 1:
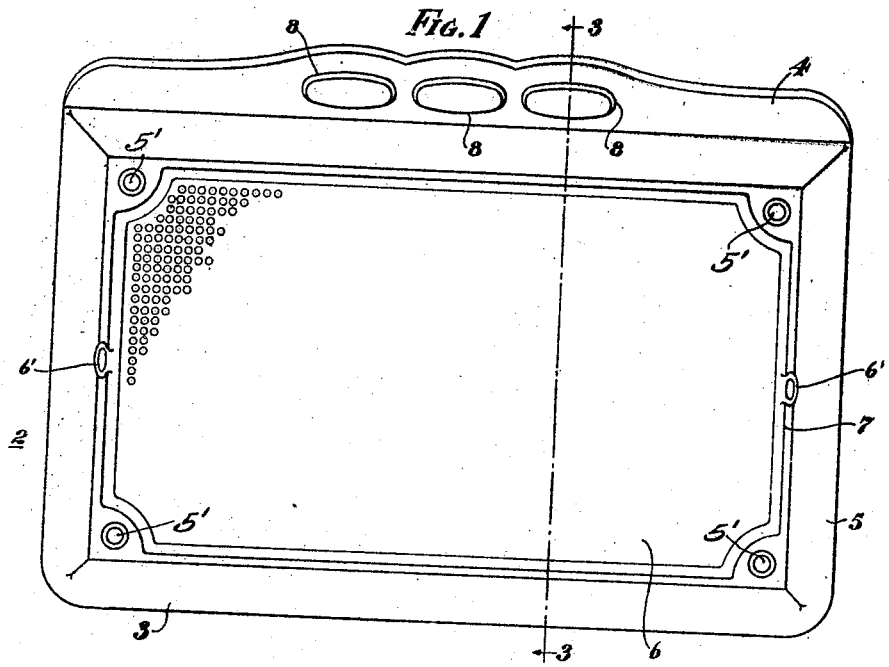
Figure 1 is a top plan view of the step.
Figure 2:
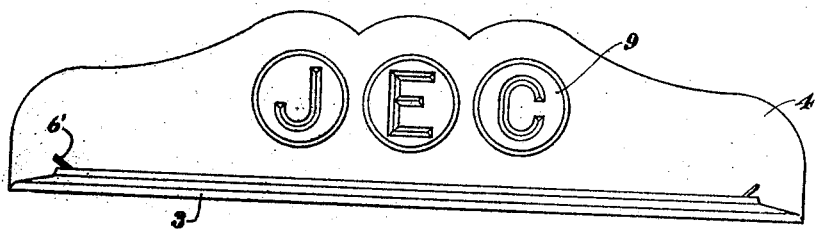
Fig. 2 is an edge elevation as seen from the outer side.
Figure 3:
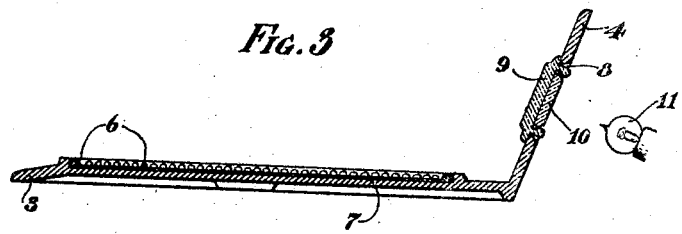
Fig. 3 is a transverse section on the line 3—3 of Fig. 1.

The step selected for illustration is denoted in a general way by 2. It may be of any proper construction. As represented it comprises a body 3 and a flange 4 rising from the back of the body at an obtuse angle thereto. This relation is a way of positioning the flange and anything carried thereby, out of the way of the feet of a person using the step.

As shown the body 3 comprises a main portion 5 practically in the form of a rectangular plate, and a tread member 6 virtually of rectangular formation and involving a mat-like structure which is removably set in the virtually rectangular seat 7 in such a way that the upper surface of the mat or tread member is practically flush with the marginal upper surface of the main portion 5. Obviously the step may be connected with a vehicle such as an automobile in any desired manner. For instance the step may have the corners of the main portion perforated as at 5' to receive fastening bolts or screws.

The flange portion 4 carries some identifying date such as one or more symbols. These symbols may be one or more initials of the name of the owner of the car equipped with the step, and are carried directly by the flange 4. This naturally brings the symbol above the tread portion of the step so that the identifying date of whatever it may be, will not be thereby soiled.

As shown the flange 4 has one or more openings 8 formed therein. These may be of any shape or number, generally they are circular. They may interchangeably as shown, receive within them the translucent disks 9 and may for instance be of some glazed substance and have incorporated in them some identifying symbols, which may as shown be letters, although I am not restricted in this regard. The letters or other symbols 9 may have fitted in their backs lenses as 10. Behind the lenses may be arranged a lamp or lamps as 11 wired to the generator of the car or other source of electric energy. During day use it will not be necessary to flash the lamp or lamps because the symbol or symbols will readily show from the front of the flange without any other display. The tread member 6, usually in the form of a mat-like part, can be lifted from place by grasping the handles 6' connected with the ends of the frame thereof.

What I claim is:—

An automobile step comprising a body having a flange at its rear and at an angle to the body, the body having means whereby it can be fastened to the running board of an automobile and the flange having a translucent identifying symbol member incorporated therein.

In testimony whereof I affix my signature.

JOHN W. CONWAY.

In presence of—
   ALICE G. CARROLL,
   MARY F. LONG.